United States Patent [19]
Knox et al.

[11] Patent Number: 5,872,968
[45] Date of Patent: Feb. 16, 1999

[54] DATA PROCESSING NETWORK WITH BOOT PROCESS USING MULTIPLE SERVERS

[75] Inventors: Richard Ian Knox, Renfrewshire; Colin David McCall, Strathclyde, both of United Kingdom

[73] Assignee: International Business Machines Corporation, Armonk, N.Y.

[21] Appl. No.: 832,262

[22] Filed: Apr. 3, 1997

[30] Foreign Application Priority Data

Oct. 16, 1996 [GB] United Kingdom .................... 9621556

[51] Int. Cl.$^6$ ....................................... G06F 9/06
[52] U.S. Cl. ..................... 395/652; 395/200.52
[58] Field of Search .................. 395/651, 652, 395/653, 200.5, 200.51, 200.52

[56] References Cited

U.S. PATENT DOCUMENTS

| | | | |
|---|---|---|---|
| 5,404,527 | 4/1995 | Irwin et al. ............................ | 395/700 |
| 5,557,748 | 9/1996 | Norris ................................... | 395/200.5 |
| 5,794,031 | 8/1998 | Nakadai ................................. | 395/652 |

*Primary Examiner*—Kevin A. Kriess
*Attorney, Agent, or Firm*—Edward H. Duffield

[57] ABSTRACT

A data processing network has a client connected to first and second servers in which the first and second servers are operable to communicate with the network according to first and second incompatible data communication protocols. The client is operable to issue, onto the network, a first initial boot request (e.g. RPL) according to the first data communication protocol (IEEE 802.2) and the first server is operable, in response to the client request to send BOOTP bootstrap code to the client system. The BOOTP bootstrap code is loaded into client memory and when executed causes the client to issue a BOOTP request for servicing by the second server system.

10 Claims, 4 Drawing Sheets

DATA PROCESSING NETWORK WITH BOOT PROCESS USING MULTIPLE SERVERS

TECHNICAL FIELD OF THE INVENTION

The present invention relates to a data processing network of the type in which a plurality of client computer systems are connected to one or more server computer systems.

BACKGROUND OF THE INVENTION

In a typical network environment, multiple client computer systems (clients) are connected to one or more server computer systems (servers). In a first common arrangement, each client includes an operating system, and optionally other software, stored on a hard file within the client. On power-up or reboot, the client boots from the operating system stored on the hard file without reference to the server computer. This type of boot is called a local program load. Other application software e.g. word processing, database software etc, held on storage associated with the server system, is accessed as needed by the client.

In an alternative boot technique, the client does not boot from a locally stored operating system. One reason for this is that the client does not have a local mass storage device such as a hard file on which the operating system software can be stored. Such client systems are often referred to as 'diskless' systems. Consequently, when a diskless client is powered-up, the client executes code within a read only memory (ROM) on the network card within the client which causes the server to transfer the operating system software to volatile storage in the client for use until the client system is powered-off.

There are currently two main methods used to boot a diskless client from a server over a local area network. The first of these is the Remote Initial Program Load protocol (hereinafter termed 'RPL'), which is based on the IEEE 802.2 Data Link Control standard, and which is used primarily by Personal Computers (PCs) for example in Token-Ring Networks. The second method is the TCP/IP Bootstrap Protocol (BOOTP) which is used primarily, though not exclusively, by UNIX workstations.

Although the RPL and BOOTP methods make use of the same basic concept, they are in fact incompatible in that it is not possible to boot an RPL client from a BOOTP server or vice versa. With the growing use of TCP/IP on networks of PCs, a method of booting a PC over the network using TCP/IP is desirable. One solution to this problem would be to provide the PC customer with two separate bootstrap ROMs thereby allowing the customer to choose BOOTP or RPL depending on the type of network in which the PC is to be employed. However, if the customer wishes to change from BOOTP to RPL then it is necessary to change the ROM.

What is needed therefore is a technique allowing booting in a mixed network environment, for example to allow an RPL client to boot from a BOOTP server.

SUMMARY OF THE INVENTION

Accordingly, in a first aspect of the present invention, there is provided a data processing network comprising at least one client system connected to first and second server systems, the first and second server systems being operable to communicate with the network according to first and second incompatible data communication protocols respectively, the client system being operable to issue, onto the network, a first boot request according to the first data communication protocol, the first server being operable, in response to the client request to send bootstrap code to the client system, which code when executed on the client causes the client to issue a second boot request according to the second communication protocol for servicing by the second server system.

In a preferred network, the first communication protocol is the IEEE 802.2 data link control protocol on which is based the RPL boot process. The second communication protocol is the TCP/IP protocol on which is based the BOOTP boot process.

In one alternative network, the first and second server systems are separate computer systems. However it is possible for the first server to consist of software executable on the second server processor for responding to the first boot request to issue bootstrap code for the second communication protocol.

According to a second aspect of the invention, there is provided a data processing network comprising at least one client system connected to first and second server systems, the first and second server systems being operable to communicate with the network according to first and second incompatible data communication protocols respectively, the at least one client system being operable to issue, onto the network, first and second boot requests according to the first and second data communication protocols for servicing by either the first or second server systems.

In this alternative arrangement, the client includes 'hybrid' boot code which causes the client, in one of the embodiments to be described below, to issue boot requests according to both communication protocols. The client downloads its software image from the first server to respond.

Preferred embodiments of the present invention will now be described, by way of example only, with reference to the accompanying drawings.

DETAILED DESCRIPTION OF THE INVENTION

In order to illustrate the principles of the present invention, first will be described the conventional BOOTP and RPL boot techniques. Then will be described two alternative techniques for booting an RPL client from a BOOTP server. It will be clear that the invention is in no way limited to such an application but may instead be used for booting a BOOTP client from an RPL server. Furthermore, the principles of the present invention may be employed in any computer network having clients and servers which operate according to different boot protocols.

Figure 1:
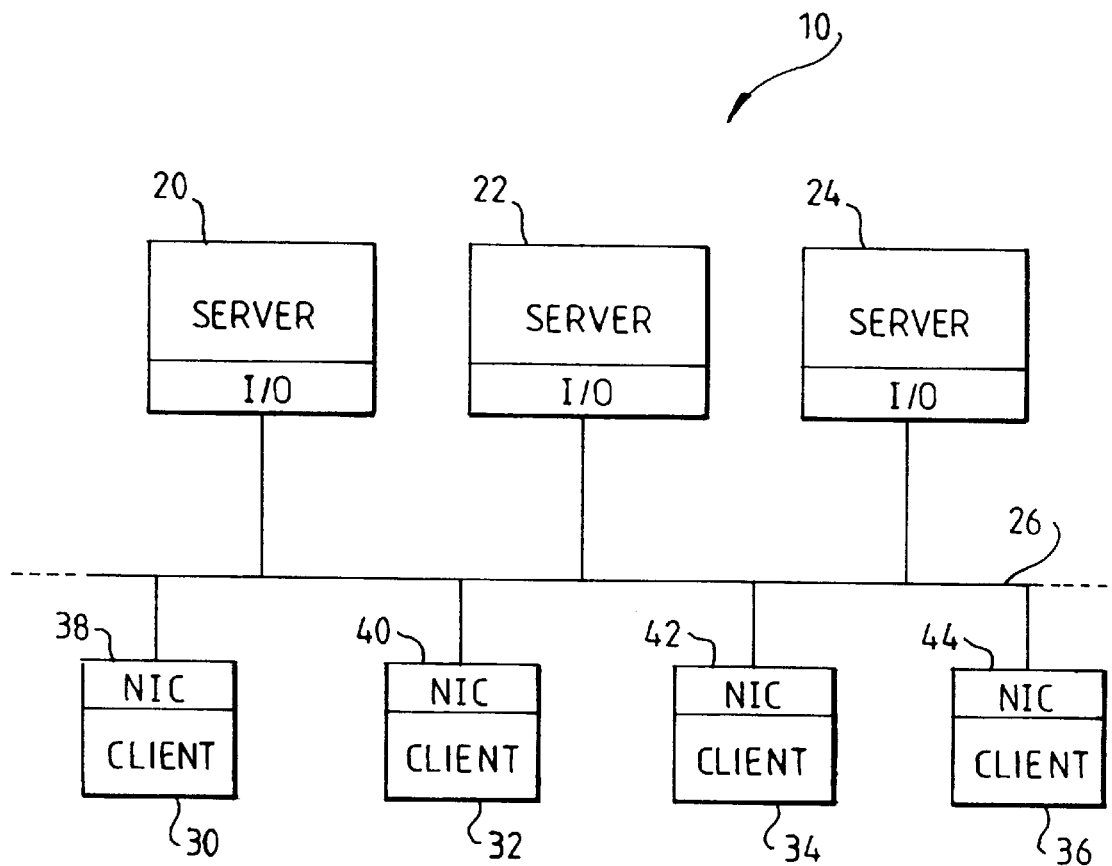
FIG. 1 is a schematic representation of an exemplary computer network in which the preferred embodiment of the present invention finds application.

Referring first to FIG. 1, there is shown a computer network 10 which is one example of a network topology in which the present invention finds application. Network 10, which may be constituted as an Ethernet or Token-ring LAN or other arrangement, is comprised of three server computer systems 20,22,24 connected for communication over a network 26 to a plurality of client computer systems 30, 32, 34, 36.

Servers 20, 22 which may be IBM PC 700 computer systems, are configured as BOOTP servers in that they include communication software for responding to client boot requests formatted according to the TCP/IP BOOTP protocol. Server 24, which may also be an IBM PC 700 computer system operating under the control of network operating system IBM OS/2 WARP Server, for example, is configured as an RPL server in that it responds to client RPL requests formatted according to the IEEE 802.2 data link control standard. Other suitable network operating systems include Netware from Novell Inc and IBM LAN Server from IBM.

Client computer systems 30 and 32 may be personal computers based on the Intel X86 family of microprocessors. They each include a network interface card 38, 40 to provide communication with the server computer. The network interface card may be an ethernet card as in the arrangement of FIG. 1, which card includes RPL code stored in ROM for connecting the client computer systems 30 and 32 to the network.

Client computer systems 34 and 36 may be UNIX workstations, each including a network adapter card 42, 44 providing code operable to issue boot requests over the network according to the TCP/IP BOOTP protocol.

As will be appreciated, the use of two distinct communication protocols in the network of FIG. 1 has the result that client systems 30 and 32 are operable to communicate only with server 24. Similarly, client systems 34 and 36 are operable to communicate only with servers 20 and 22. Thus, each of client systems 30, 32 may only boot from and receive its operating software from server 24. Similarly, each of client systems 34 and 36 may only boot from and receive its operating software from server 20 and 22.

Figure 2:
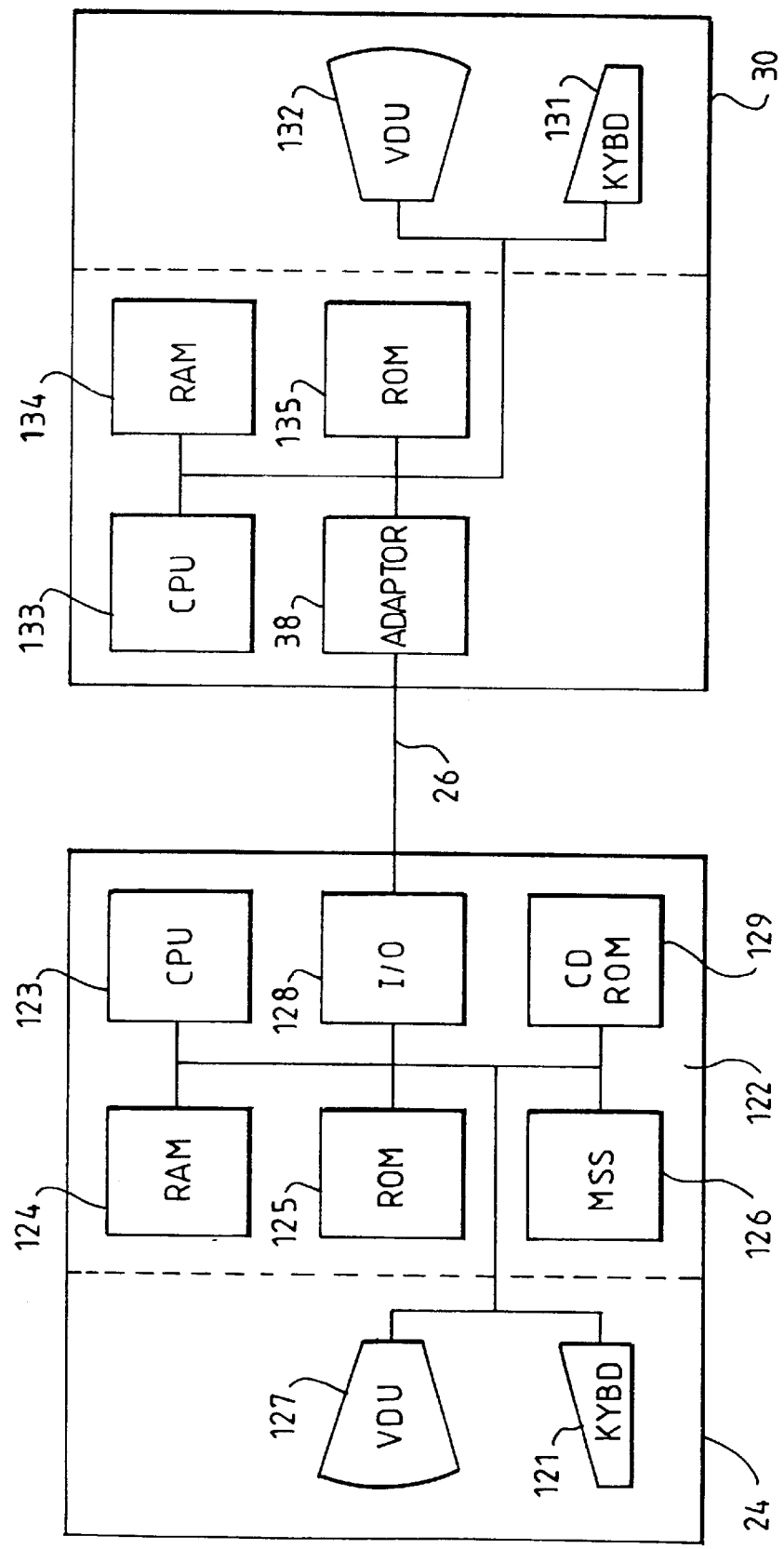
FIG. 2 is a block-diagrammatical representation of a client computer system connected to a server computer system in the network of FIG. 1.

FIG. 2 is a simplified block diagram in which server computer system 24 is shown connected to client system 30 over communication link 26. As is normal, the client system, constituted in the present embodiment by a personal computer, includes a keyboard 132 and a display 131 operating under the control of control logic in the form of main CPU 133 which is connected by a system bus to system memory (RAM) 134 and non-volatile memory (ROM) 135, in which is stored system BIOS. If it is desired to prevent the client user from introducing software or data into the client system, the client system is advantageously not provided with a diskette drive, CD-ROM drive or similar. The client system further includes a network adapter card 38 which, in the present embodiment, may be either an ethernet or token-ring adapter card. This adapter card allows for communication between the client and server.

The server computer system 24 includes a keyboard 121 attached to a system unit 122 including a main CPU 123, system RAM 124, system ROM 125 and mass storage capability 126, typically in the form of multiple magnetic disk drives constituted in a RAID (redundant array of independent disks) arrangement. Stored on the server mass storage devices are a variety of different types of software including operating system software, images of which are transferred to the client system 30 during the boot process, and application software. The server system may optionally include a display 127 (if the network administrator requires direct interaction with the server system) and other storage devices such as a diskette drive (not shown) and CD-ROM drive 129. Communication over the link 26 is provided by input/output logic 128 which may take the form of an adapter card.

Next will be described the steps involved in a conventional boot process according to both RPL and BOOTP protocols.

At power-on or reboot of an RPL client, e.g. client 30, the system BIOS causes the client to invoke RPL code stored on the client's network adapter card 38. This RPL code, executing on the system processor 133, causes the client to broadcast RPL requests onto the network, the RPL request specifying at least the network address of the client. The RPL code additionally opens a Service Access Point (SAP) at the client through which responses are received during the boot process. In the present embodiment RPL server 24 receives the RPL requests and checks, using the client address, whether it is responsible for booting the client and if so responds by sending a reply to the client directly using the network address specified in the RPL request. The reply specifies the network address of the responding server. The client then requests the software image from server 24 which responds to this request by sending the software image to the client which then loads the image into memory and begins to execute it. The RPL process itself is well known in the art and is described for example in the IBM Token-Ring Network Remote Program Load Users' Guide Version 1.0 SK2T-0333-01.

The BOOTP process is very similar in operation to the RPL process described above, but differs essentially in the communication protocol on which it is based. In BOOTP, a single packet exchange is performed between the requesting client and the server, e.g. client 34 and server 20 in FIG. 1. The same packet field layout is employed in both directions, each packet including an 'opcode' field which specifies whether the packet is a 'bootrequest' or a 'bootreply' packet. On connection to the network at power-on, code in the client network interface card 42 causes the client 34 to issue a 'bootrequest' packet onto the network, which packet specifies the hardware address of the client and optionally specifies the address of the server from which the client wishes to download its software image. In the present embodiment however, the client request does not specify a particular server and the bootrequest is therefore broadcast to all computers on the network. On receipt of the bootrequest packet, each BOOTP server on the network checks the client hardware address against entries in its database to determine whether it is able to service the bootrequest from that client. Those servers which include the client hardware address in the database return a 'bootreply', package to the client specifying the server address, the client IP address and the location of the boot file(s) to be downloaded to that client. On receipt of the 'bootreply', the client requests a transfer of the file, generally using the tftp protocol, although other protocols can be used. The client stores the received file in memory and starts to executes it. The BOOTP process is well known in the art —further information can be found in RFC 951"BOOTSTRAP PROTOCOL (BOOTP)", September 1985 published by the Network Working Group, written by B Croft and J Gilmore.

It will be appreciated from the above description that the BOOTP and RPL boot protocols are based on a similar concept but differ essentially in the format of the boot requests sent by the client and the responses sent by the server. The differing formats result in the two boot protocols being incompatible. With the growing use of TCP/IP on networks of PCs, it is becoming desirable to allow a PC, which is otherwise configured to boot from an RPL server, to boot from a BOOTP server.

Next will be described, with reference to FIG. 3, a first technique for permitting an RPL client to boot from a BOOTP server.

Figure 3:
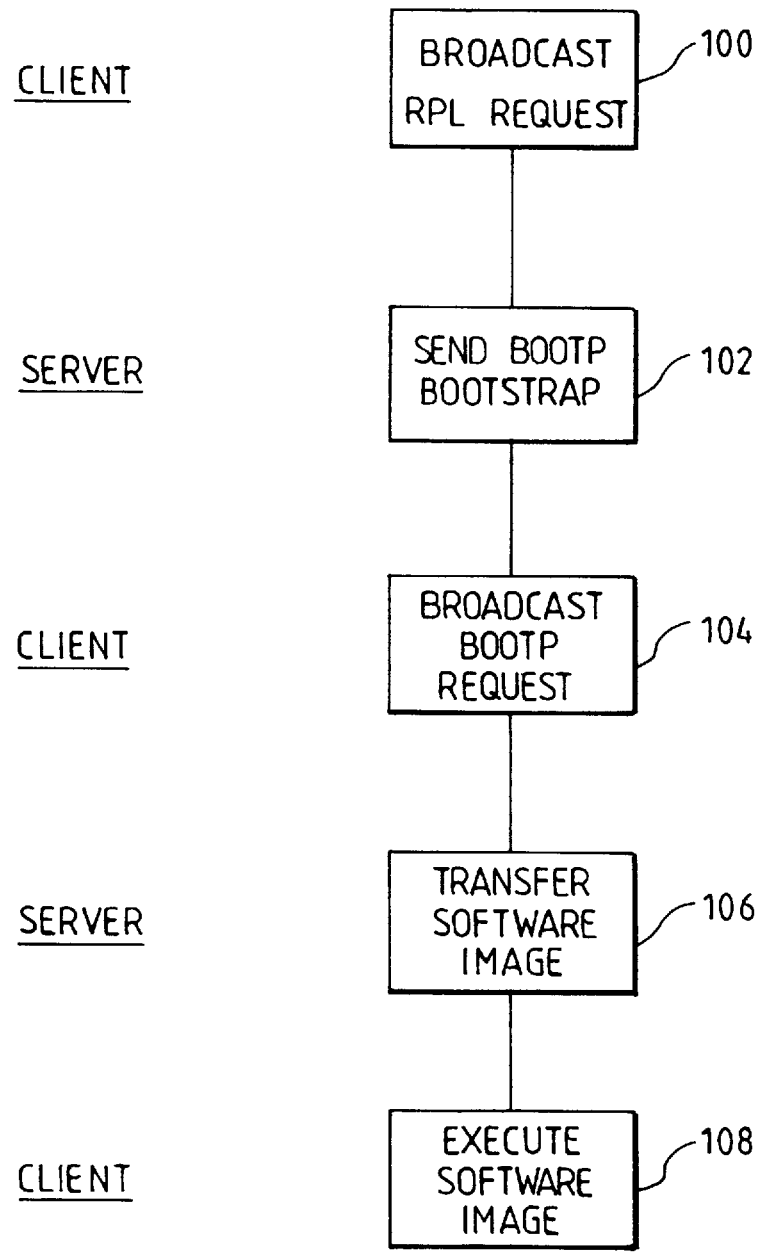
FIG. 3 is a flow diagram showing the steps involved in a boot technique according to one embodiment of the present invention.

At step 100 in FIG. 3, the RPL client broadcasts RPL requests onto the network as normal and in response to these requests, an RPL server responds 102 with a BOOTP bootstrap image. The RPL client executes this code and issues 104 BOOTP requests over the network according to the TCP/IP protocol. These requests may either specify a particular BOOTP server or alternatively may be broadcast to all computers on the network, in which latter case all BOOTP servers on the network, on receipt of the BOOTP requests, identify whether they are set-up to service the requesting client. In other words, the BOOTP servers on the network see and respond to the BOOTP requests as if they had originated from a native BOOTP client. The software image is then transferred 106 to the requesting client according to the normal BOOTP operation for storage in volatile memory in the client.

In allowing for RPL clients to boot from BOOTP servers, the above described technique has certain advantages.

Firstly, when the network contains both RPL and BOOTP clients, as in FIG. 1, it is not necessary for the final operating system images to be held in two places. The final images used by both BOOTP and RPL clients are all held on the BOOTP server(s) (i.e. it is not necessary for these images to be held on the RPL servers). This simplifies configuration and maintenance. Secondly, the RPL server downloads the same image to all RPL clients and this image remains unchanged, even if the final operating systems are updated. Also because all the RPL clients receive the same image, a Default image can be used and so the RPL server does not need to be informed and updated when new RPL clients are added to the network. This means that there is no ongoing maintenance of the RPL server. Thus, according to this first technique, the RPL server is configured to respond to RPL requests from all clients with the BOOTP bootstrap image.

A further important advantage of this technique is that no hardware or software changes are required at the RPL client to enable it to boot from a BOOTP server. This means that a network can be migrated from RPL to BOOTP without needing to replace or modify any of the existing clients. Similarly, additional RPL clients can be added to the network which will be able, without modification, to boot from the BOOTP server(s).

As the BOOTP bootstrap image on the RPL server will not include operating system software for the client, it will generally be relatively small and will therefore occupy very little disk space in the server. The small amount of code will also result in rapid transfer times to the client therefore requiring little network bandwidth or CPU utilisation on the server. For these reasons, the RPL server need not be a powerful computer unlike the server holding the final software images which has to download the entire operating system used by the client. Therefore the RPL server can be implemented on any suitable network attached computer which has a disk drive or indeed on the BOOTP server containing the final operating system images. In other words, an additional dedicated machine is not absolutely necessary.

Although in the foregoing, the first technique has been described with reference to the booting of an RPL client from a BOOTP server, it is clear that the same principle may be used for booting a BOOTP client from an RPL server. In this case, the initial server is a BOOTP server and the initial image contains RPL bootstrap code. The above described technique is readily extendable to other existing and future boot protocols for example the dynamic host configuration protocol (DHCP).

Figure 4:
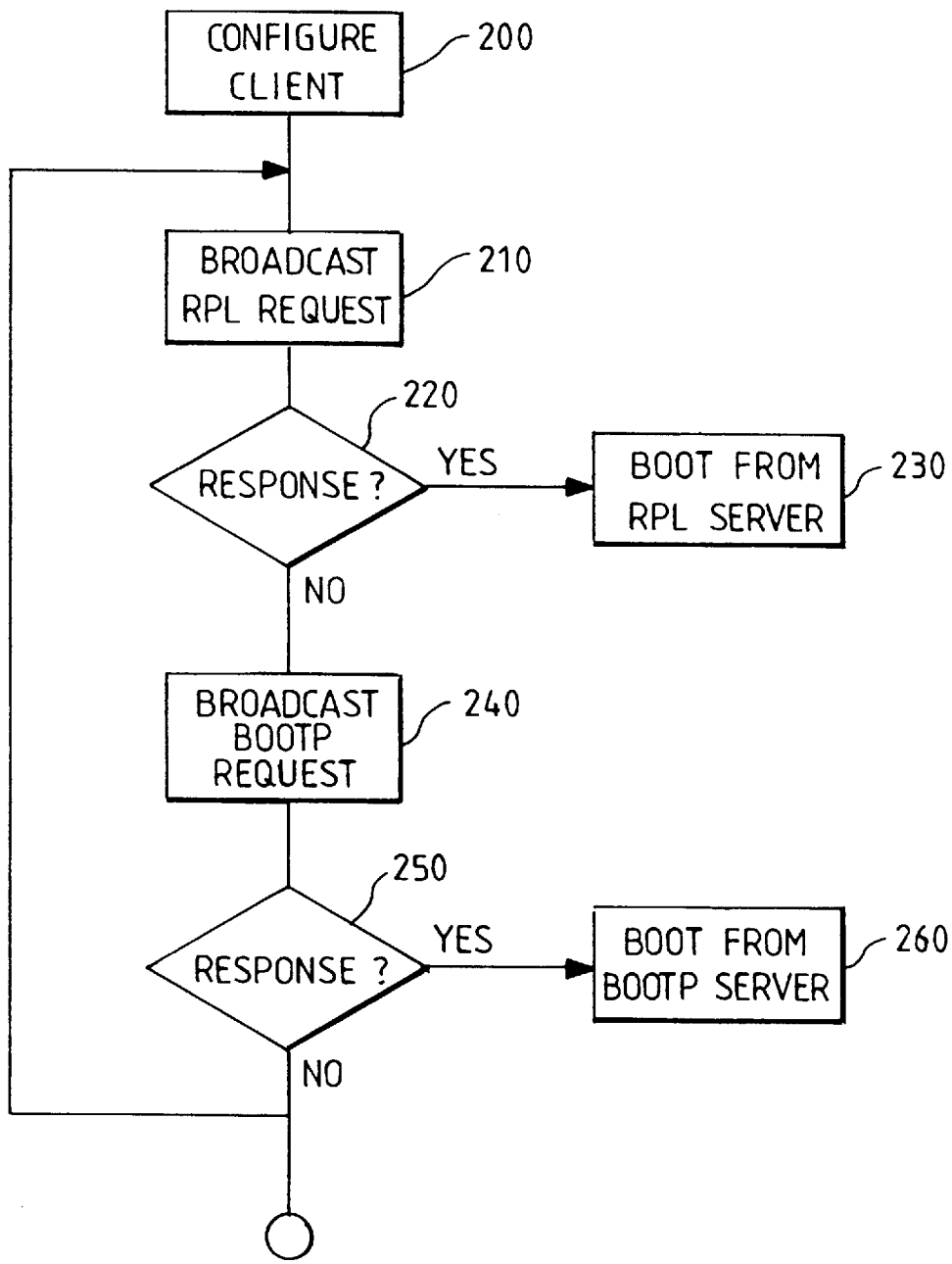
FIG. 4 is a flow diagram indicating the steps involved in a boot technique according to a second embodiment of the present invention.

Next will be described an alternative technique for booting an RPL client from a BOOTP server. In this technique, the client system includes modified ('hybrid') code in ROM on its adapter card. This code is arranged so as to allow the client to issue both BOOTP and RPL requests onto the network i.e. to communicate according to both TCP/IP and IEEE 802.2 protocols. FIG. 4 is a flow diagram illustrating this alternative technique. Firstly, at step 200, the 'hybrid' client is configured to receive both RPL and TCP/IP data by opening at least one Service Access Point (SAP) for each of RPL and TCP/IP. The client system executing the client ROM code then broadcasts RPL requests and BOOTP requests alternately on the network. The client first broadcasts 210 an RPL request and waits for a response 220. If a response is received via the RPL SAP from an RPL server within a specified time period (e.g. one second), the client boots 230 from the RPL server in the normal way by sending a 'send file' request to the server. If no response is received during the time period, the client then broadcasts 240 a BOOTP request. If a response is received via the TCP/IP SAP during the time period, the client boots 260 from the responding BOOTP server by issuing an tftp request for the final software image.

Using this second technique, the client will thus repeatedly poll the different servers until one replies. The client will be successfully booted from the correct server because servers only reply to those clients whose network addresses are contained in the server's database. In order to use this technique, the ROM on the client adapter card will contain more code than for a pure RPL or BOOTP implementation. However as the code is not needed once the bootstrap is successfully loaded, it need not occupy CPU address space once the boot is successful. Again as with the first technique described above, this technique is not limited in applicability to BOOTP and RPL. Furthermore, providing there is space in the client for the necessary code, there is no reason why additional boot protocols may not be included.

Although in the foregoing, the client systems have been described as being diskless systems i.e. they include no non-volatile storage for operating system and application software, the principle of the present invention may be employed in client systems which do include mass storage. In a network employing such clients, the client system may be forced for example to boot from the server at each power-on to load down its operating system and other software. By this means, the network administrator keeps control over the software on the client system.

What is claimed is:

1. A data processing network comprising at least one client system connected to first and second server systems, the first and second server systems being operable to communicate with the network according to first and second incompatible data communication protocols respectively, the client system being operable to issue, onto the network, a first boot request according to the first data communication protocol, the first server being operable, in response to the client request, to send bootstrap code to the client system, which code when executed on the client causes the client to issue a second boot request according to the second communication protocol for servicing by the second server system.

2. A data processing network as claimed in claim 1, wherein the first and second server systems are separate computer systems.

3. A data processing network as claimed in claim 1 wherein the first boot request is an RPL request and the second boot request is a TCP/IP BOOTP request.

4. A data processing network as claimed in claim 1 comprising further client systems operable to issue boot requests according to the second communication protocol for servicing by the second server.

5. A data processing network as claimed in claim 1 wherein the client system(s) do not include non-volatile storage for storage of programs loaded from the servers.

6. A data processing network comprising at least one client system connected to first and second server systems, the first and second server systems being operable to communicate with the network according to first and second incompatible data communication protocols respectively, the client system being operable to issue, onto the network, first and second boot requests according to the first and second data communication protocols for servicing by either the first or second server systems respectively.

7. A data processing network as claimed in claim 6, wherein the client system includes a network interface card including non-volatile storage means for storage of program code executable on the client to issue the first and second boot requests.

8. A method of operating a data processing network comprising at least one client system connected to first and second server systems, the first and second server systems being operable to communicate with the network according to first and second incompatible data communication protocols respectively, the method comprising:

at power-on or re-boot of the client system, issuing a first boot request from the client system onto the network according to the first communication protocol; and responsive to the receipt of the boot request at the first server system, transferring bootstrap code to the client to cause the client to issue onto the network a second boot request according to the second communication protocol.

9. A method as claimed in claim 8, comprising the further step of transferring operating software from the second server system to the client system in response to receipt of the second boot request at the second server system.

10. A method as claimed in claim 8 wherein the first boot request is an RPL request and the second boot request is a BOOTP request.

\* \* \* \* \*